United States Patent Office 3,548,546
Patented Dec. 22, 1970

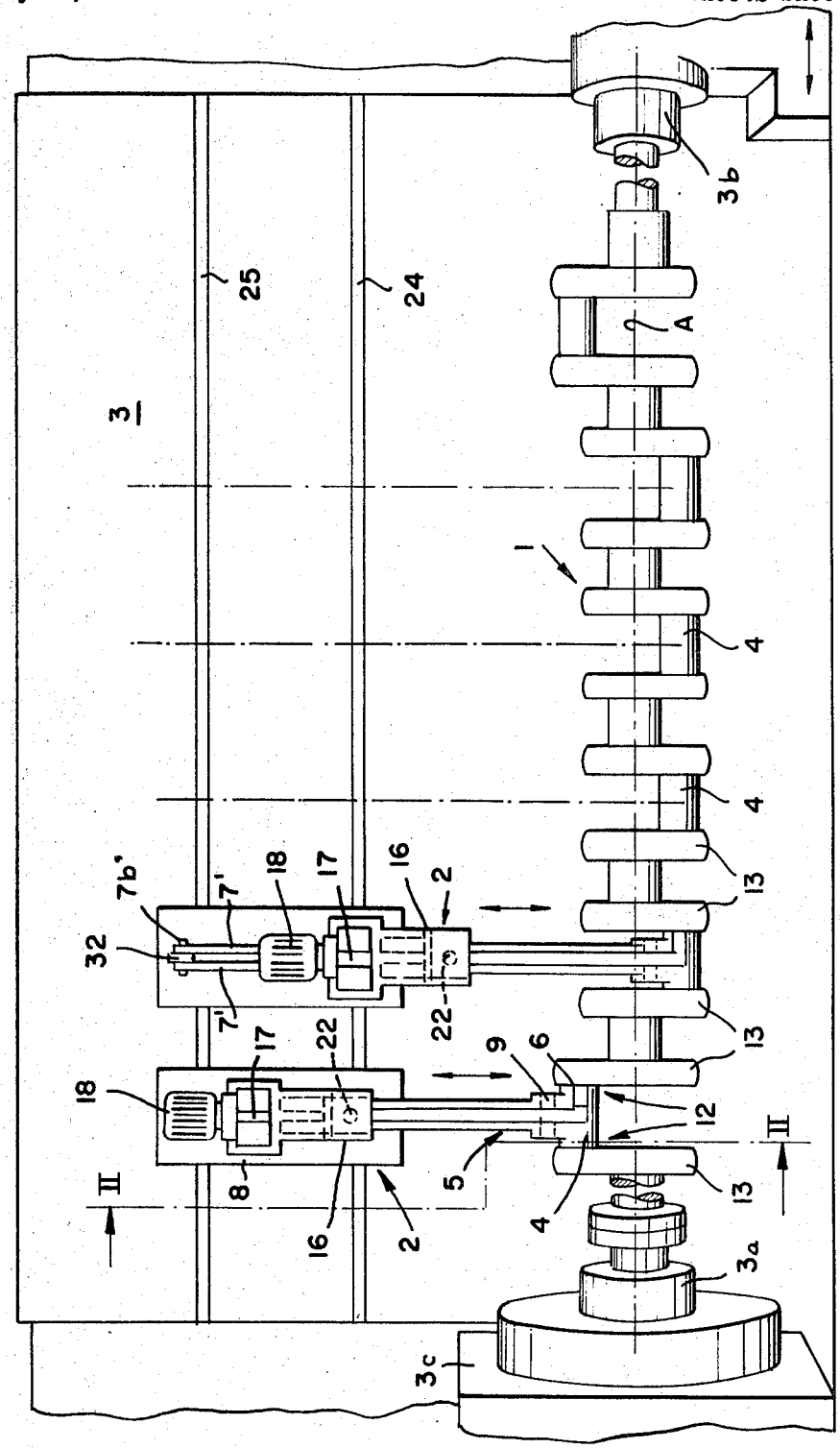

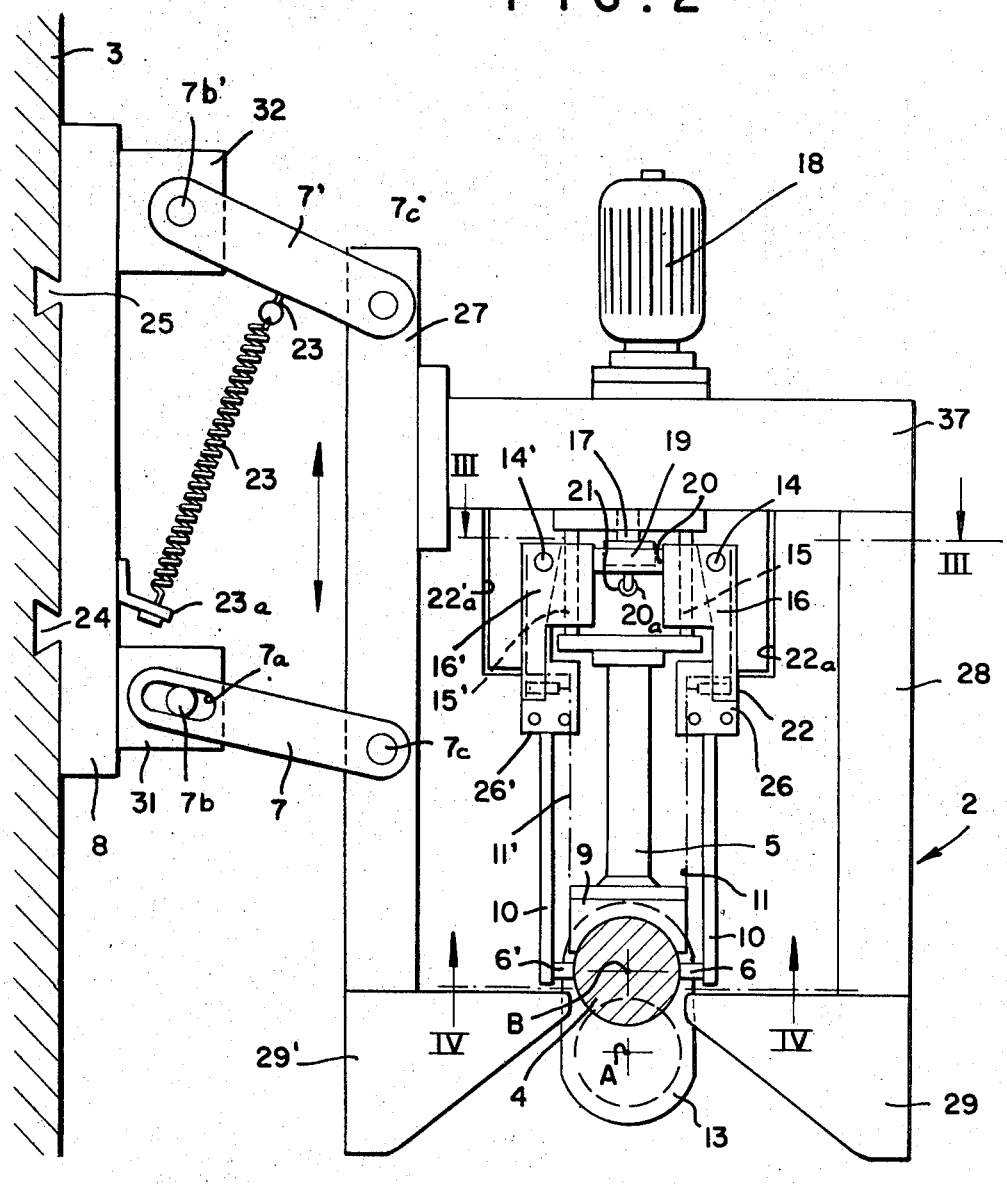

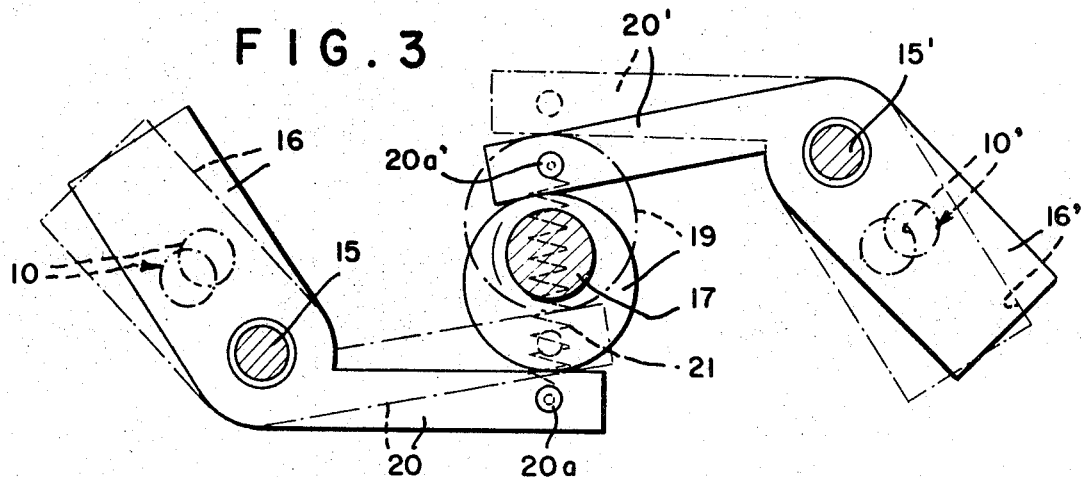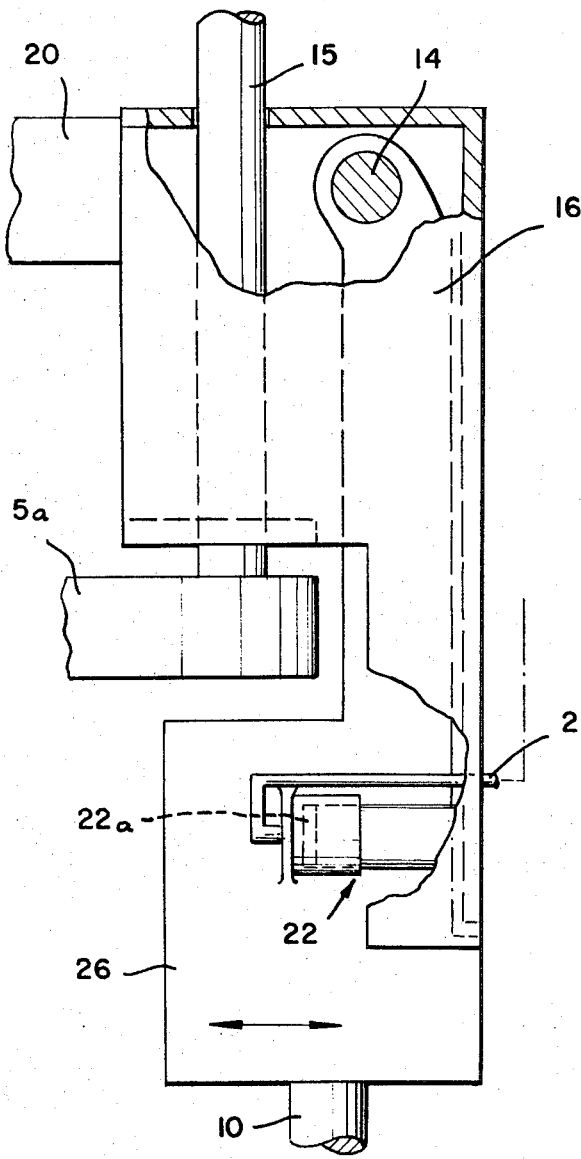

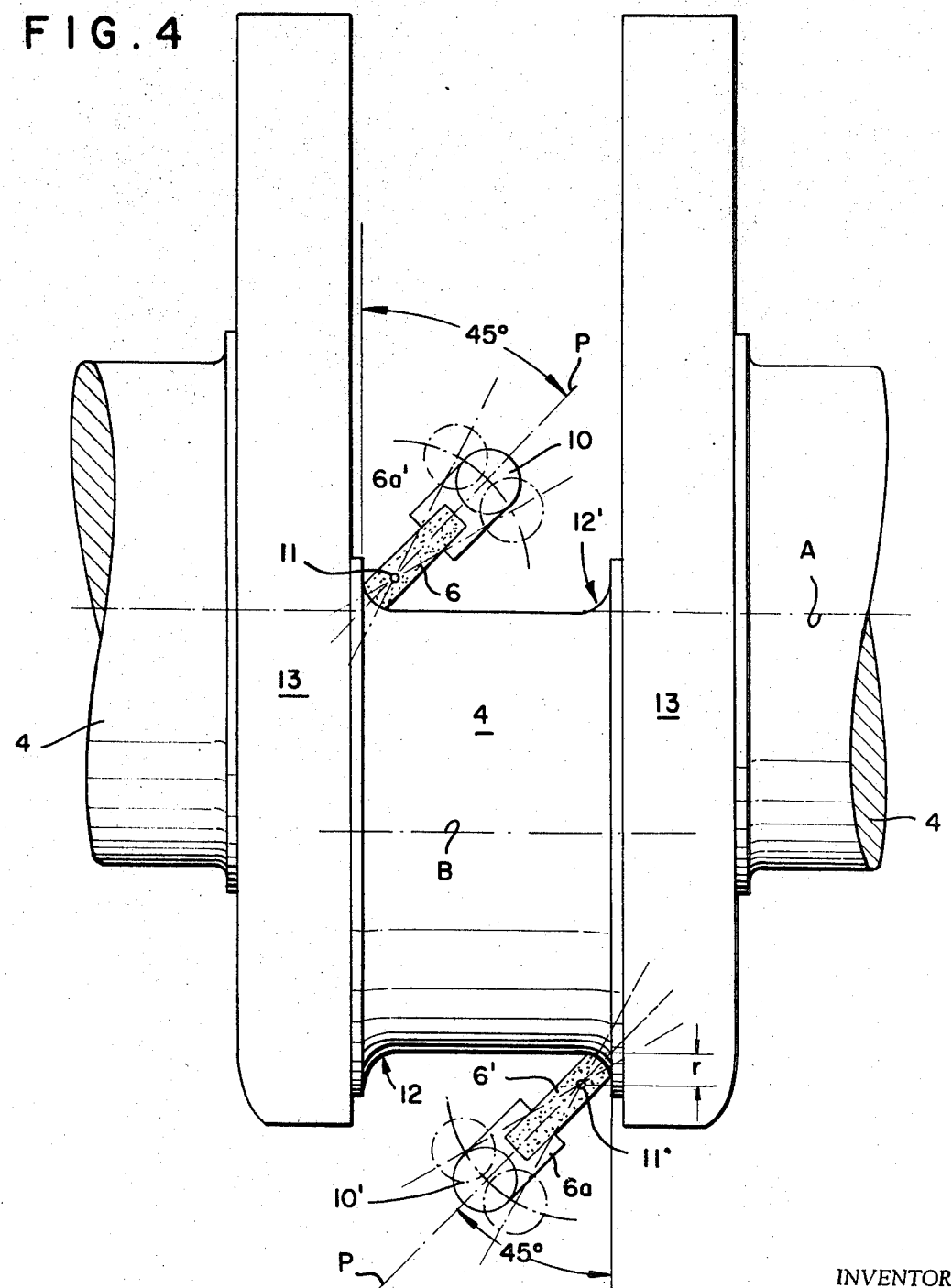

3,548,546
APPARATUS FOR MACHINING A
FILLET SURFACE
Ernst Thielenhaus, Wuppertal-Elberfeld, and Rudolf
Schwär, Neviges, Germany, assignors to Maschinenfabrik Ernst Thielenhaus, Wuppertal-Elberfeld, Germany, a corporation of Germany
Filed July 31, 1968, Ser. No. 749,023
Claims priority, application Germany, Aug. 2, 1967,
1,652,115
Int. Cl. B24b 7/00, 9/00
U.S. Cl. 51—58                                      10 Claims

ABSTRACT OF THE DISCLOSURE

To machine, especially to finish, a toroidal fillet surface between a cylindrical workpiece portion and an adjoining annular shoulder, the workpiece is rotated about an axis parallel to its cylindrical shoulder while a tool in contact with the fillet surface is rapidly oscillated about a swing axis skew to the axis of rotation, the tool being carried on a holder which forms part of an assembly entrained by the rotating workpiece with maintenance of an invariable relative position of the two axes.

Our present invention relates to an apparatus for finishing or otherwise machining a toroidal surface on a fillet between a cylindrical portion and an adjoining annular shoulder of a workpiece such as a crankpin or a journal pin.

In commonly owned application Ser. No. 745,025 filed July 15, 1968 by one of us, Rudolf Schwär, there has been disclosed an apparatus for machining the cylindrical portion of such a workpiece by a set of three abrasive tools mounted on a common support for joint displacement toward and away from the cylinder axis, the support being displaceable in a plane transverse to that axis on being entrained by the interengagement between the tools and the workpiece. The tools, whose working faces are cylindrically concave, effectively grind or polish the pin itself but cannot reach the toroidal surface or surfaces of the transition zones, hereinafter referred to as fillets, by which such pins are integrally connected with adjoining annular shoulders defined by transverse webs at one or both ends thereof.

Though the need for smooth finishing is less obvious in the case of such fillets than with the cylindrical pin surfaces which must fit into coacting eyes or journals, it has been found that irregularities in the fillet surface may give rise to faults affecting the joint or bearing of which the workpiece forms a part.

Thus, it is the general object of our present invention to provide an apparatus for machining, especially finishing, a toroidal fillet surface on, for example, a cast crankpin or journal pin whose cylindrical surface is independently machinable by conventional means or by the system disclosed in the aforementioned copending application.

A more particular object of this invention is to provide an apparatus of this character, for use on workpieces having confronting fillet surfaces at opposite ends, which simultaneously machines both these surfaces.

An apparatus according to the present invention has first drive means, such as a lathe chuck or faceplate, for rotating the workpiece to be machined about an axis parallel to the axis of its cylindrical portion, this portion being engageable on at least two points, lying along an arc centered on an axis of curvature which coincides with the cylinder axis, by one or more contact elements on a displaceable support which follows the rotation of the workpiece and carries a tool holder oscillatable, in a plane parallel to the aforementioned axis of curvature, about a swing axis skew to the axis of rotation, the tool holder being coupled with a second drive means for performing such oscillations at a rapid rate whereby a tool bit mounted on the holder sweeps back and forth across the toroidal fillet surface, thus over an angle of up to 90°. Advantageously, for the simultaneous machining of two fillet surfaces, a second tool holder is mounted on the support for oscillation about a swing axis parallel to that of the first tool holder, the two swing axes being preferably disposed on opposite sides of the axis of curvature of the contact arc so as to be jointly actuatable by a common, centrally located cam or similar mechanism representing the aforesaid second drive means.

To facilitate the movement of each tool holder into and out of an operative position in which its tool bit engages the toroidal workpiece surface, this holder may consist of two parts, i.e., a base coupled with the associated drive mechanism and a stem pivotally mounted thereon, this stem being substantially parallel to the swing axis of the tool when in its operative position. For reasons of symmetrical engagement and disengagement, we prefer to let the two tool-carrying stems pivot in planes which include their respective swing axes and lie at an angle of about 45° with reference to the axis of workpiece rotation. Fluid-operated servomotors, with flexible supply lines, may be used to control the withdrawal and return of the tool-holder stems from and to their operative positions.

Since each tool bit has only limited contact with the toroidal fillet surface to be machined, the radius of this surface is precisely determined by the invariable position of the corresponding swing axis relative to the axis of rotation; by the same token the working face of the tool bit is trued by its engagement with this surface toward which it may be urged by fluid pressure through the above-mentioned servomotor.

The above and other features of our invention will become more fully apparent from the following detailed description of a preferred embodiment, reference being made to the accompanying drawing in which:

FIG. 1 is a perspective view of a finishing apparatus according to our invention;

FIG. 2 is a cross-sectional view taken along line II—II of FIG. 1 but drawn to a larger scale;

FIG. 3 is a sectional view taken along line III—III of FIG. 2;

FIG. 4 is a sectional view taken along line IV—IV of FIG. 2; and

FIG. 5 is a detail view of part of the assembly of FIG. 2, partly broken away and drawn to an enlarged scale.

FIG. 1 shows two supports 2 riding between webs 13 on respective crankpins 4 of a crankshaft 1. This crankshaft 1 is held between a driven faceplate 3a and the dead center of a movable tailstock 3b of a lathe for rotation about a horizontal axis A. Sliders 8 carrying the supports 2 are axially shiftable in guide grooves 24 and 25 along a standard 3, rigid with the lathe bed, and can be arrested thereon by retaining means not shown.

FIG. 2 shows one support 2 in greater detail. Mounted on the slider 8 are two lugs 31 and 32. Pairs of links 7 and 7' are articulated to these lugs 31 and 32 by respective pins 7b and 7b' pin 7b riding in elongated slots 7a in an end of each link 7. On their opposite ends these links 7 and 7' are pivotally attached by means of pins 7c and 7c' to a vertical bar 27 forming part of the displaceable tool support 2. A contractile spring 23 connected between a hook 23b on one link 7' and an abutment 23a on the slider 8 urges this bar 27 downward, as viewed in FIG. 2, while allowing for a swinging of the bar about its fulcrum 7c' within the limits of slots 7a.

A substantially horizontal arm 37 constituting the upper part of the support 2 extends from the bar 27 and carries a second bar 28 depending parallel to the bar 27. The bars 27 and 28 terminate at their lower ends in generally triangular feet 29 and 29' which form guide surfaces to align the tool support 2 with the associated crankpin 4 upon lowering of the support outs crankshaft 1.

A hydraulic or pneumatic motor 18 mounted on the arm 37 has a shaft 17 carrying an eccentric cam disk 19 (see FIG. 3). A pair of cam followers 20 and 20', forming extensions of two hollow members 16 and 16' pivotable about respective pins 15 and 15', are interconnected by a spring 19 anchored thereto at 20a and 20a' for urging these followers into contact with opposite sides of disk 19. Pivot pins 15 and 15' define a pair of substantially vertical swing axes 11, 11' skew to the horizontal axis of rotation. A Members 16 and 16' are the bases of a pair of tool holders also including rods 10, 10' which are pivoted thereon at 14, 14' (as best seen in FIG. 5) and are swingable in planes P, P' (FIG. 4) including the respective axes 11, 11'.

A saddle 9 with a cylindrical contact surface, having an axis of curvature B coinciding with that of crankpin 4, bears upon that crankpin while being carried at the lower end of a column 5 which is held in a collar 5a suspended from arm 37 by the pivot pins 15, 15'.

Tool bits (e.g., grinding or honing stones) 6 and 6' engageable with fillets 12 and 12' at the transition zones between the cylindrical workpiece portion 4 and adjoining annular shoulders 13 are fitted into sockets 6a, 6a' at the lower extremities of tool holders 10, 16 and 10', 16'. The rods 10 and 10' can be swung in their planes P and P', including angles of 45° with axes A, B and therefore also with the planes of webs 13, by means of servomotors 22, 22' in the form of small double-acting hydraulic cylinders receiving their motive fluid through conduits 22a, 22a' and flexible supply lines not shown. These servomotors, apart from operatively positioning the tools at the beginning of a machining step and withdrawing them from the finished workpiece, also supply to necessary contact pressure as the tool holders rotate about axes 11, 11' during the surface treatment. The tool bits 6, 6' have arcuate working faces wide enough to complement the angle of oscillation (here about 30°) to an overall sweep of about 90°; in the illustrated embodiment, therefore, the width of each tool as seen in FIG. 4 is approximately equal to the fillet radius r. The fillet surface and the tool surface are mutually trued by the relatively fast oscillation of the tool and the concurrent, relatively slow rotation of the crankpin.

The fillet-machining device described above may be combined, if desired, with a crankpin-finishing device as disclosed in the above-identified Schwär application; thus, the slides 8 of FIGS. 1 and 2 may be removed from the standard 3 and replaced by carriers for the ganged triple tools used in accordance with that application to machine the workpiece portions 4.

In order to accommodate wrokpieces of different diameters, the column 5 with its saddle 9 may be exchanged for different bracing members of similar construction and other radii of curvature; the pivot pins 15, 15', may also have to be relocated in such event. Saddle 9 can be replaced by sets of two or more rods or rollers engaging the crankpin 4 at two or more generatrices along part of its cylindrical surface. These and other modifications, readily apparent to persons skilled in the art, are intended to be embraced within the spirit and scope of our invention as defined in the appended claims.

We claim:

1. An apparatus for machining a toroidal fillet surface between a cylindrical workpiece portion and an adjoining annular shoulder transverse to the cylinder axis, comprising;

first drive means for rotating the workpiece to be machined about an axis of rotation parallel to the cylinder axis;

a displaceable support having contact means engageable with said cylindrical portion along an arc centered on an axis of curvature parallel to said axis of rotation for entrainment of said support by said workpiece upon rotation of the latter, said axis of curvature coinciding with said cylinder axis;

a tool holder on said support oscillatable in a plane parallel to said axis of curvature about a swing axis skew to said axis of rotation;

and second drive means for rapidly oscillating said tool holder about said swing axis during rotation of said workpiece by said first drive means.

2. An apparatus as defined in claim 1, for use on a workpiece having another toroidal fillet surface confronting the first-mentioned fillet surface, further comprising a second tool holder on said support oscillatable in said plane about another swing axis parallel to the first-mentioned swing axis, said second tool holder being coupled with said second drive means for oscillation thereby about said other swing axis.

3. An apparatus as defined in claim 2 wherein said swing axes are disposed on opposite sides of said axis of curvature.

4. An apparatus as defined in claim 2 wherein said second drive means comprises cam means rotatable about a further axis parallel to said swing axes, said tool holders being provided with extensions bearing upon said cam means.

5. An apparatus as defined in claim 4 wherein said further axis is centrally located between said swing axes, said second drive means including a spring interconnecting said extensions for urging same into contact with said cam means.

6. An apparatus as defined in claim 1 wherein said tool holder has a base coupled with said second drive means and a tool-carrying rod substantially parallel to said swing axis in an operative position of the tool holder, said rod being pivotally mounted on said base for retraction from said operative position.

7. An apparatus as defined in claim 6 wherein said rod is pivotable on said base in a plane including said swing axis and lying at an angle of substantially 45° with reference to said axis of rotation.

8. An apparatus as defined in claim 6 wherein said tool holder is provided with fluid-operated servo means for retracting and returning said stem from and to said operative position.

9. An apparatus as defined in claim 1, further comprising a standard fixed with reference to said axis of rotation, articulated link means connecting said support with said standard, and biasing means urging said contact means toward said axis of rotation.

10. An apparatus as defined in claim 9 wherein said support has guide surfaces engageable with said workpiece for operatively aligning said tool holder with said fillet surface.

References Cited

UNITED STATES PATENTS

| | | | |
|---|---|---|---|
| 3,345,783 | 10/1967 | Militzer | 51—58 |
| 3,089,289 | 5/1963 | Serafin | 51—58 |
| 2,654,189 | 10/1953 | Dunn et al. | 51—33.1 |

FOREIGN PATENTS

| | | | |
|---|---|---|---|
| 484,418 | 10/1929 | Germany | 51—33.1 |

JAMES L. JONES, JR., Primary Examiner